United States Patent
Ning et al.

(10) Patent No.: US 9,168,601 B2
(45) Date of Patent: Oct. 27, 2015

(54) MULTI-FLUTE REAMER AND CUTTING INSERT THEREFOR

(75) Inventors: Li Ning, Latrobe, PA (US); Michael Schuffenhauer, Fuerth (DE); Bernhard Eckl, Rottendorf (DE); Xaver Spichtinger, Oberviechtach (DE); Armin Josef Zimmermann, Oberviechtach (DE); Thilo Klaus Juergen Mueller, Erlangen (DE)

(73) Assignee: KENNAMETAL INC., Latrobe, PA (US)

( * ) Notice: Subject to any disclaimer, the term of this patent is extended or adjusted under 35 U.S.C. 154(b) by 945 days.

(21) Appl. No.: 12/948,009

(22) Filed: Nov. 17, 2010

(65) Prior Publication Data

US 2012/0121352 A1 May 17, 2012

(51) Int. Cl.
*B23D 77/00* (2006.01)
*B23D 77/02* (2006.01)

(52) U.S. Cl.
CPC .......... *B23D 77/02* (2013.01); *B23D 2277/205* (2013.01); *B23D 2277/26* (2013.01); *B23D 2277/30* (2013.01); *B23D 2277/32* (2013.01); *B23D 2277/44* (2013.01); *Y10T 408/9095* (2015.01)

(58) Field of Classification Search
CPC .... B23D 77/02; B23D 77/00; B23D 2277/26; B23D 2277/30; B23D 2277/44
USPC ............ 408/229, 713, 227, 234, 232; 407/30, 407/33, 114, 115, 116, 56, 54, 51, 34; 409/234, 232
See application file for complete search history.

(56) References Cited

U.S. PATENT DOCUMENTS

| | | | | |
|---|---|---|---|---|
| 2,093,986 | A * | 9/1937 | Staples Evans M | 408/144 |
| 4,199,284 | A | 4/1980 | Kress et al. | |
| 4,425,063 | A * | 1/1984 | Striegl | 408/81 |
| 4,946,318 | A * | 8/1990 | David et al. | 407/42 |
| 5,213,452 | A * | 5/1993 | Kirby | 407/42 |
| 5,494,383 | A * | 2/1996 | Kress et al. | 408/231 |
| 5,795,111 | A * | 8/1998 | Kress et al. | 408/224 |
| 5,904,452 | A * | 5/1999 | Kress | 408/57 |

(Continued)

FOREIGN PATENT DOCUMENTS

| | | |
|---|---|---|
| CN | 101623777 A | 1/2010 |
| DE | 3120219 A1 | 5/1981 |

OTHER PUBLICATIONS

State Intellectual Property Office of the People's Republic of China, "First Office Action (English language Reference Translation) for CN 201110363192.9", Apr. 1, 2015, 14 pp.

(Continued)

*Primary Examiner* — Eric A Gates
*Assistant Examiner* — Paul M Janeski
(74) *Attorney, Agent, or Firm* — Larry R. Meenan

(57) ABSTRACT

A multi-flute reamer includes a cutting portion having a forward end and a rearward end, and a chip flute with a chip gash opening, and a cutting insert mounted on the cutting portion. A leading edge is formed at an intersection between a top surface and a radially-outward side surface, and a front edge is formed at an intersection between the top surface and a forward side surface. The cutting insert includes a rounded lead cutting edge formed at the intersection between the leading edge and the front edge, and the top surface includes a chip breaker having a bottom surface formed with a radius, R.

10 Claims, 6 Drawing Sheets

(56) References Cited

U.S. PATENT DOCUMENTS

| | | | | |
|---|---|---|---|---|
| 5,921,727 | A * | 7/1999 | Depperman | 408/144 |
| 6,183,173 | B1 * | 2/2001 | Ritter | 408/59 |
| 6,503,030 | B2 * | 1/2003 | Kress et al. | 408/188 |
| 6,575,672 | B1 * | 6/2003 | Maier | 408/59 |
| 6,913,428 | B2 * | 7/2005 | Kress et al. | 408/144 |
| 7,322,779 | B2 * | 1/2008 | Kress et al. | 409/234 |
| 7,625,161 | B1 * | 12/2009 | Ruy Frota de Souza | 408/227 |
| 7,765,902 | B2 * | 8/2010 | Kuroda et al. | 82/1.11 |
| 8,057,132 | B2 | 11/2011 | Johansson et al. | |
| 2006/0056925 | A1 * | 3/2006 | Hecht et al. | 407/37 |
| 2009/0110503 | A1 | 4/2009 | Shaheen | |
| 2010/0008735 | A1 * | 1/2010 | Dudzinsky et al. | 407/48 |
| 2010/0202843 | A1 | 8/2010 | Kress | |
| 2010/0209205 | A1 | 8/2010 | Kress | |

OTHER PUBLICATIONS

Levallee, U.S. Pat. No. 2,940,342-A, Jun. 14, 1960.†
Kress et al., U.S. Pat. No. 4,199,284-A, Apr. 22, 1980.†

\* cited by examiner
† cited by third party

MULTI-FLUTE REAMER AND CUTTING INSERT THEREFOR

BACKGROUND OF THE INVENTION

Known rotary cutting tools for performing reaming operations typically comprise a cutting head having an axis of rotation. The cutting head has a forward end and a peripheral surface extending rearwardly therefrom. The peripheral surface includes at least two cutting inserts or wiping pads extending rearwardly from the forward end and a chip flute for the evacuation of chips produced during the cutting operation.

One disadvantage of conventional reamers is that the chips produced during a cutting operation flow directly into the chip flute, thus lacking the ability to control the shape and evacuation of the chips during the cutting operation. Consequently, the chips may become tangled on the tool shank and/or remain in the machined holes during the cutting operation.

SUMMARY OF THE INVENTION

The problem of controlling chip formation in a multi-flute reamer is solved by including a cutting insert with a round chamfer and a chip breaking feature along the rake face of the cutting insert, and widening the back side of the chip evacuation flute.

In one aspect, a multi-flute reamer comprises a cutting portion having a forward end and a rearward end and a peripheral surface therebetween. The cutting section includes a chip flute that extends rearwardly from the forward end. A cutting insert is mounted on the cutting portion. The cutting insert includes a top surface with a chip breaker extending an entire length, L, of the cutting insert. The chip breaker is formed with a bottom surface (58) having a radius, R. The chip breaker extends in a direction of a central, longitudinal axis of the cutting portion.

In another aspect, a multi-flute reamer comprises a cutting portion having a forward end and a rearward end and a peripheral surface therebetween. The cutting section includes a chip flute that extends rearwardly from the forward end, wherein the chip flute includes a chip gash opening extending from the rearward end toward the forward end of the cutting portion, and wherein the chip gash opening is defined by a recessed bottom surface, a front wall formed with a radius, R2, and opposing side walls.

In another aspect, a multi-flute reamer comprises a cutting portion having a forward end and a rearward end and a peripheral surface therebetween. The cutting section includes a chip flute that extends rearwardly from the forward end. The chip flute includes a chip gash opening extending from the rearward end toward the forward end of the cutting portion, wherein the chip gash opening is defined by a recessed bottom surface, a front wall formed with a radius, R2, and opposing side walls. A cutting insert is mounted on the cutting portion. The cutting insert includes a top surface, a bottom surface, a radially-inward side surface, a forward side surface, a radially-outward side surface and a rearward side surface, wherein a leading edge is formed at an intersection between the top surface and the radially-outward side surface, and wherein a front edge is formed at an intersection between the top surface and the forward side surface, and wherein the cutting insert further includes a rounded lead cutting edge formed with a radius, R1, at the intersection between the leading edge and the front edge, and wherein the top surface includes a chip breaker having a bottom surface formed with a radius, R.

BRIEF DESCRIPTION OF THE DRAWINGS

While various embodiments of the invention are illustrated, the particular embodiments shown should not be construed to limit the claims. It is anticipated that various changes and modifications may be made without departing from the scope of this invention.

DETAILED DESCRIPTION OF THE INVENTION

Below are illustrations and explanations for a version of a multi-flute reamer and a cutting insert therefor. However, it is noted that the multi-flute reamer and cutting insert may be configured to suit the specific application and is not limited only to the example in the illustrations.

Figure 1:
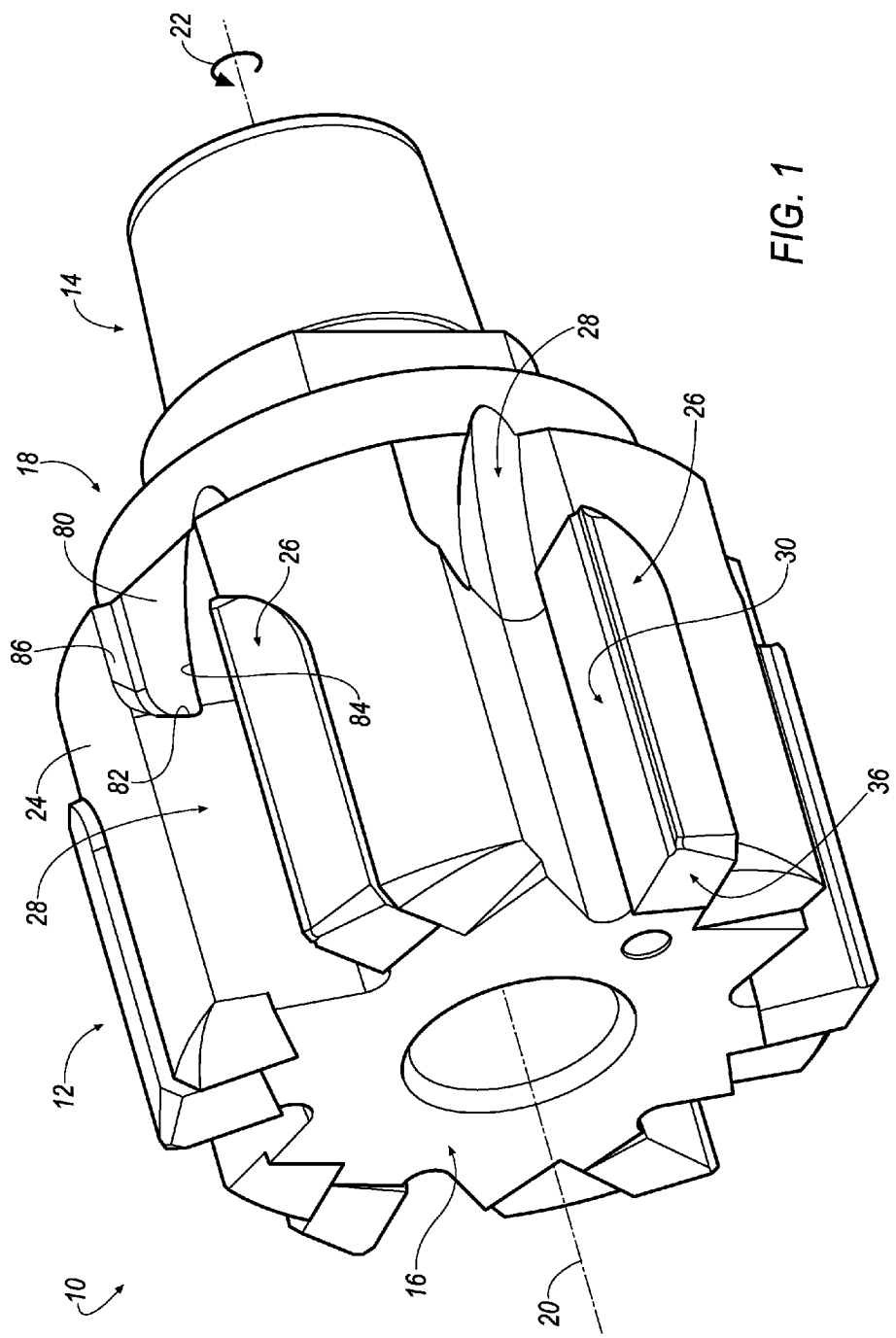
FIG. 1 is a perspective view of a multi-flute reamer with a chip breaking feature according to an exemplary embodiment of the invention.
Figure 2:
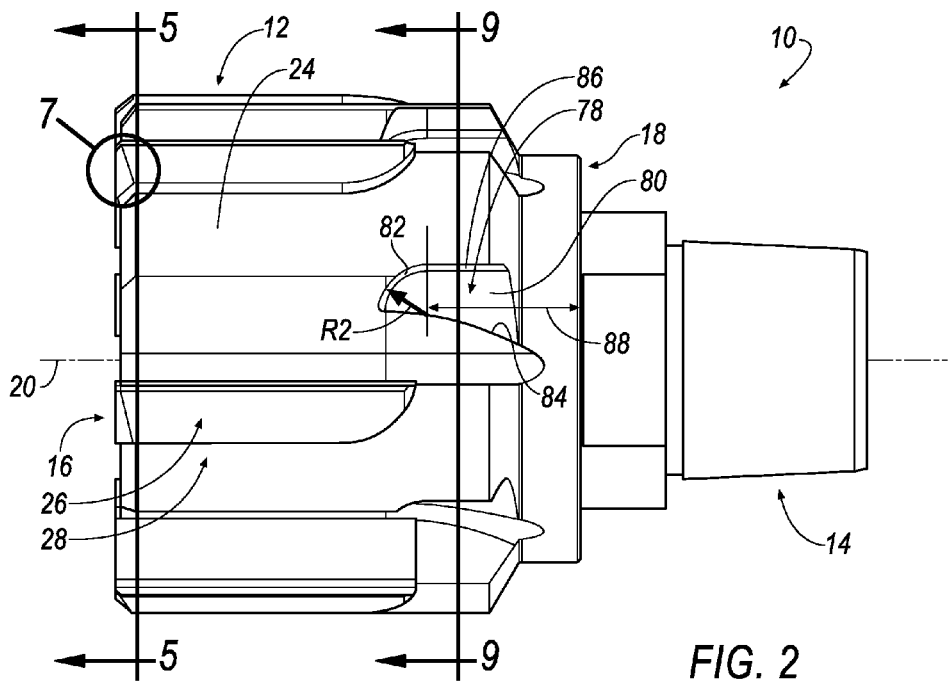
FIG. 2 is a side view of the multi-flute reamer with the chip breaking feature of FIG. 1.
Figure 3:
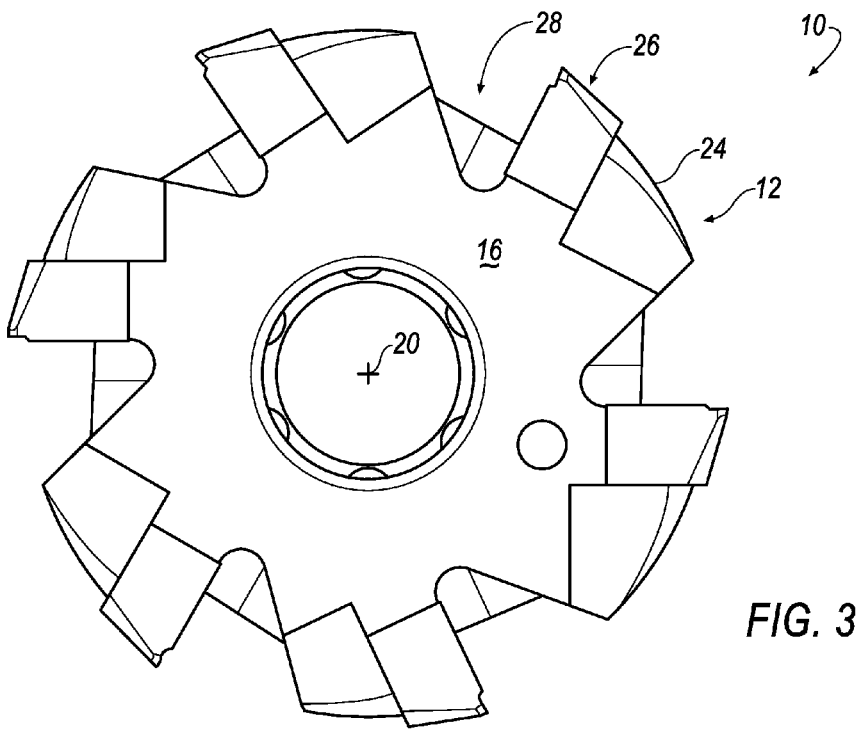
FIG. 3 is an end view of the multi-flute reamer with the chip breaking feature of FIG. 1.

Referring to FIGS. 1-3, wherein like reference characters represent like elements, a multi-flute reamer is generally shown at 10 according to an embodiment of the invention. In general, the multi-flute reamer 10 includes a cutting portion 12 and a mounting portion 14. The cutting portion 12 includes a forward end 16, and a rearward end 18. The cutting portion 12 rotates about a central, longitudinal axis 20 and a defined direction of rotation 22.

The cutting portion 12 includes a peripheral side surface 24 extending between the forward end 16 and the rearward end 18. The peripheral side surface 24 includes a plurality of cutting inserts 26 mounted thereon that extend from the forward end 16 toward the rearward end 18. In the illustrated embodiment, the reamer 10 includes six (6) cutting inserts 26. However, it will be appreciated that the invention is not limited by the number of cutting inserts, and that the invention can be practiced with any desirable number of cutting inserts, depending on design parameters, such as the cutting diameter of the reamer, and the like. A chip flute or chip gash 28 extends rearwardly from the forward end 16 toward the rearward end 18 of the cutting portion 12. The chip flute 28 extends rearwardly beyond the cutting insert 26 and allows chips formed by the cutting insert 26 to exit from the cutting portion 12 of the reamer 10 during a cutting operation.

Figure 4:
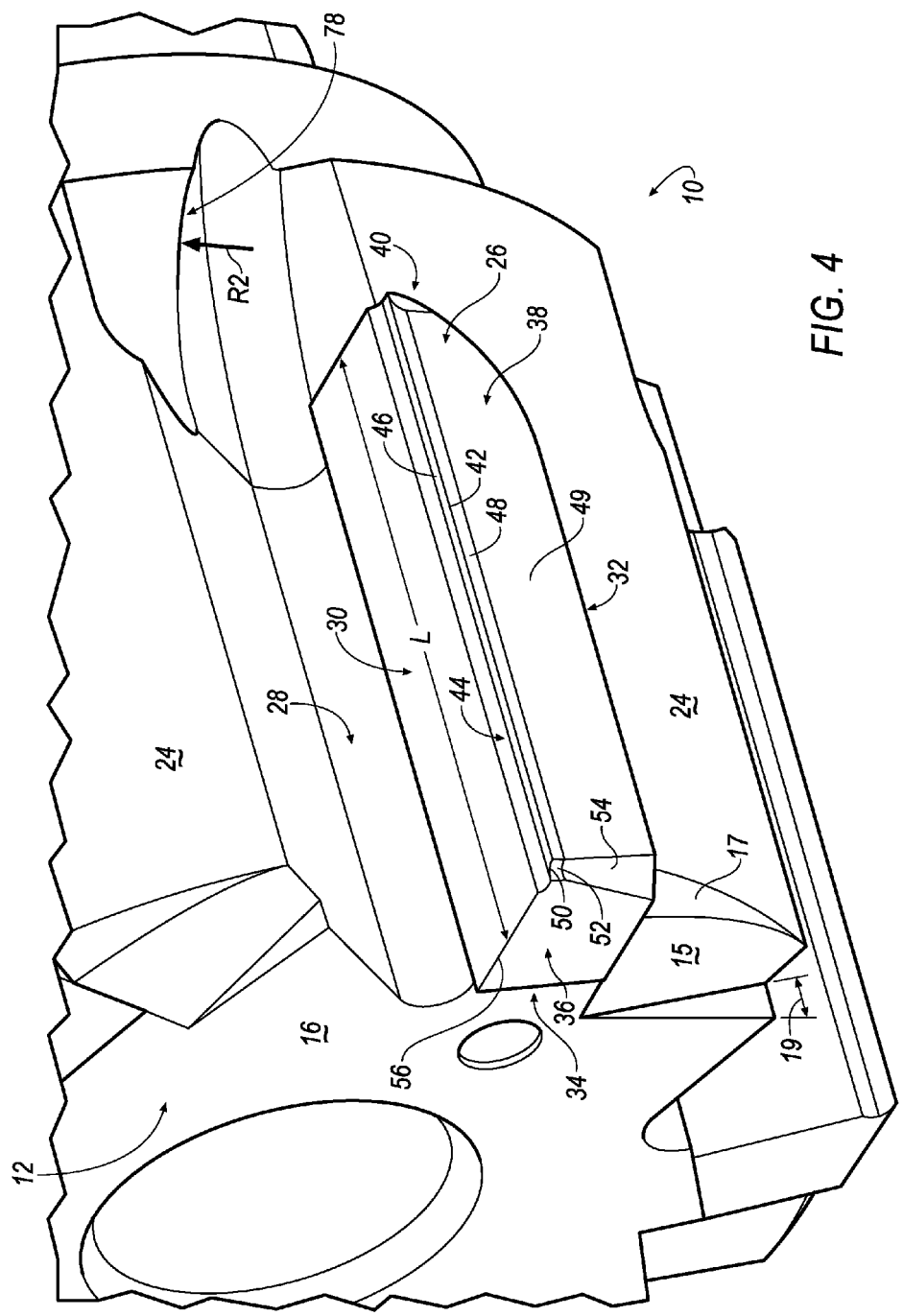
FIG. 4 is an enlarged perspective view of the cutting insert with chip breaker according to an embodiment of the invention.

Referring now to FIG. 4, each cutting insert 26 is generally rectangular in shape and includes a top surface 30, a bottom surface 32 opposite the top surface 30, a radially-inward side surface 34, a forward side surface 36, a radially-outward side surface 38 and a rearward side surface 40. A leading edge 42 with a back taper is formed at the intersection between the top surface 30 and the radially-outward side surface 38. The radially-outward side surface 38 may include a first facet surface 48 extending from the leading edge 42 to a second facet surface 49. The width of the first facet surface 48 can be in a range between about 0.1 mm to about 0.4 mm. In the illustrated embodiment, the second facet surface 49 extends from the first facet surface 49 to the bottom surface 32.

A front edge 56 is formed at the intersection between the top surface 30 and the forward side surface 36. When the front edge 56 is being used, the forward side surface 36 provides a relief surface for the cutting insert 26. In addition, the forward end 16 of the reamer 10 includes a relief surface 15 adjacent the cutting insert 26 and a radiused end surface 17 adjacent the peripheral side surface 24 to provide proper clearance for the cutting insert 26. The relief surface 15 defines a relief angle 19 that should be equal to or larger than a relief angle (not shown) formed by the forward side surface 36 with respect to the forward end 16 of the reamer 10.

One aspect of the invention is that the top surface 30 includes a chip breaker 44 extending from the forward side surface 36 to the rearward side surface 40. The chip breaker 44 allows for controlling the shape of the chip during a cutting operation. In the illustrated embodiment, the chip breaker 44 extends an entire length, L, of the cutting insert 26 from the forward side surface 36 to the rearward side surface 40. In other words, the chip breaker 44 extends in the same direction as the central, longitudinal axis 20 of the cutting portion 12 of the reamer 10. However, it will be appreciated that the invention can be practiced with the chip breaker 44 partially extending along the length, L, of the cutting insert 26. The top surface 30 also includes a rake surface 46 extending between the leading edge 42 and the chip breaker 44. Because the chip breaker 44 extends the entire length of the cutting insert 26, the rake surface 46 also extends the entire length from the forward side surface 36 to the rearward side surface 40.

Figure 5:
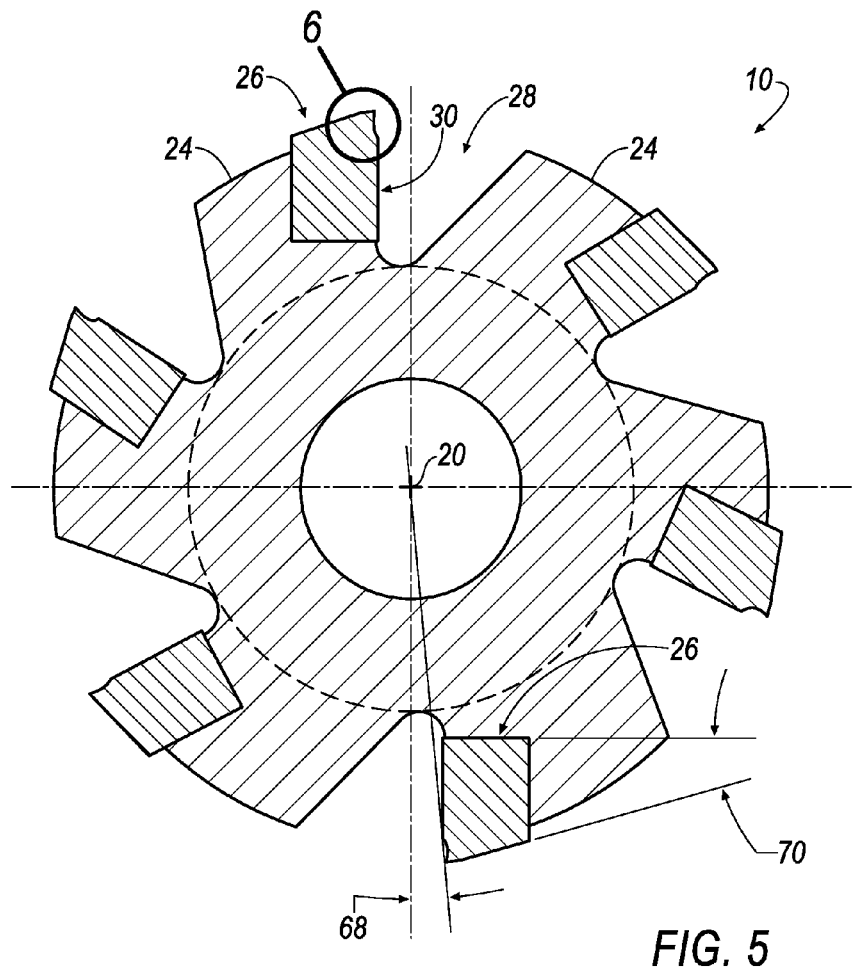
FIG. 5 is a cross-sectional view of the multi-flute reamer and cutting insert taken along line 5-5 of FIG. 2.
Figure 6:
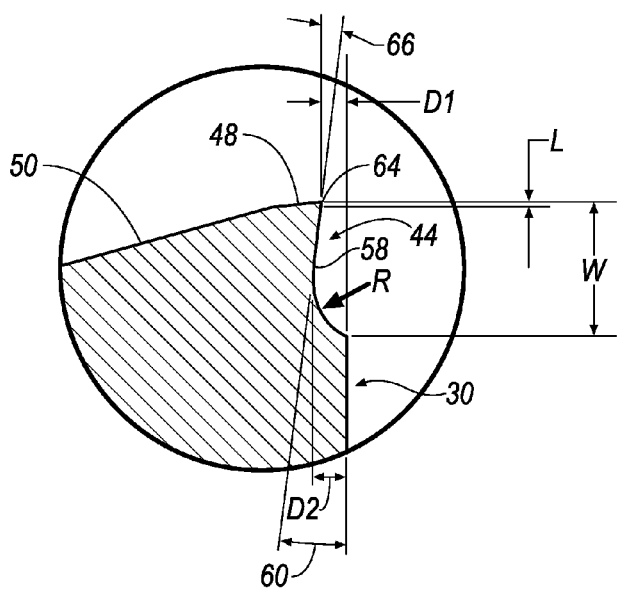
FIG. 6 is an enlarged cross-sectional view of the chip breaker of the cutting insert of the invention.

Referring now to FIGS. 5 and 6, the chip breaker 44 is formed with a bottom surface 58 having a radius, R, and a land width, W. The bottom surface 58 is scalloped such that a front depth, D1, (i.e., radially outward) with respect to the top surface 30 is less than a rear depth, D2, (i.e., radially inward) of the chip breaker 44. For example, the rear depth, D2, of the chip breaker 44 may be about 0.135 mm, larger than the front depth, D1. However, the land width, W, is larger in dimension than the depths, D1 and D2, of the chip breaker 44. For example, the land width, W, may be about 0.50 mm, and the front depth, D1, may be about 0.10 mm, and the rear depth, D2, may be about 0.235 mm. The chip breaker 44 forms a positive cutting insert rake angle 60 in a range between about one (1) degree and about fifteen (15) degrees, and in particular, about seven (7) degrees.

A front portion of the chip breaker 44 includes a T-land surface 64 having a length, L. The T-land surface 60 reduces the stresses on the cutting insert 26 during cutting operations and greatly improves performance of the cutting insert 26. The T-land surface 64 forms a negative rake angle 66 in a range between about 0.25 degrees to about 1.25 degrees. In one embodiment, the positive rake angle 66 is about 0.65 degrees.

When mounted to the cutting portion 12 of the reamer 10, the rake surface 46 of the cutting insert 26 defines a positive radial rake angle 68. The radial rake angle 68 can be in a range between about zero (0) degree to about twelve (12) degrees. In one embodiment, the radial rake angle 68 is about five (5) degrees. The cutting insert 26 also defines a relief angle 70 (or clearance angle). The relief angle 70 can be in range between about ten (10) degrees and about twenty-five (25) degrees. In one embodiment, the relief angle 70 is about sixteen (16) degrees.

Figure 7:
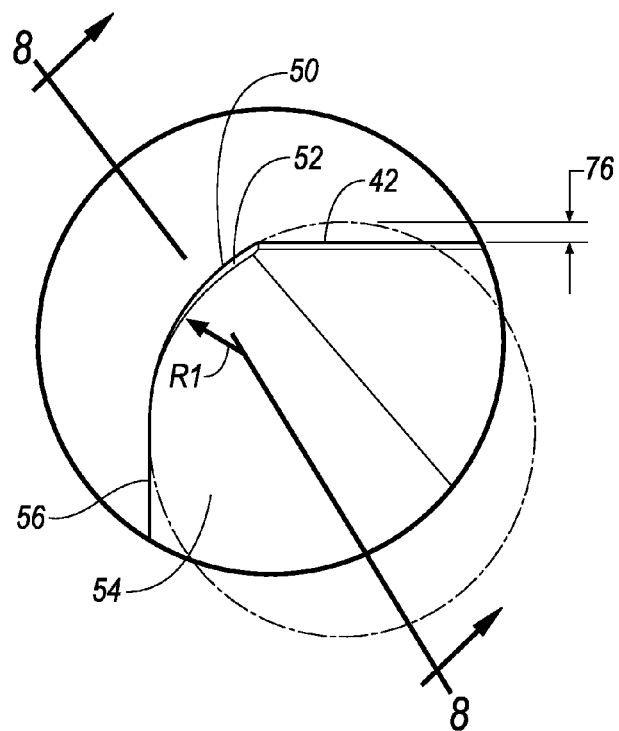
FIG. 7 is an enlarged view of the radiused cutting edge of the cutting insert of the invention.
Figure 8:
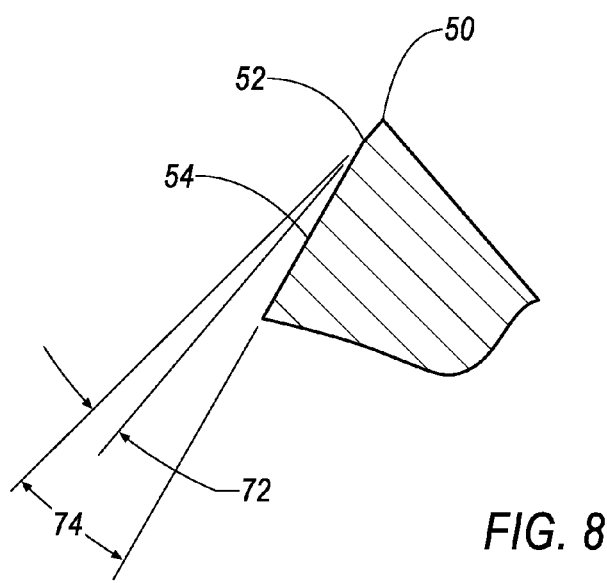
FIG. 8 is a cross-sectional view of the rounded lead cutting edge taken along line 8-8 of FIG. 7.

Referring now to FIGS. 7 and 8, another aspect of the invention is that the cutting insert 26 includes a rounded lead cutting edge 50 in the form of a rounded chamfer having a radius, R1, with a radial offset 76. The rounded lead cutting edge 50 allows for controlling the chip shape during a cutting operation. It will be appreciated that the invention is not limited by the magnitude of the radius, R1, and that the invention can be practiced with a radius that is suitable for the particular type of cutting operation. For example, in one embodiment, the radius, R1, is about 0.4.

In the illustrated embodiment, one end of the rounded lead cutting edge 50 is tangential to the forward end 16 of the reamer 10, while the other end is not tangential to the leading edge 42. Thus, the rounded lead cutting edge 50 is radially offset with respect to the leading edge 42 by a radial offset 76. The radial offset 76 provides a larger allowance for positioning the cutting insert 26 properly on the cutting portion 12 of the reamer 10. In one embodiment, the radial offset 76 in a range between about one (1) percent to about fifteen (15) percent. For example, the rounded lead cutting edge 50 can be formed with a radius of about 0.6 with a radial offset of about 0.06 (about 10% of the radius). In one embodiment, the distance 76 is about 0.04 mm. For larger radii, the radial offset can be smaller, for example, five (5) percent of less to provide better dimensional tolerance for the cutting insert 26. It will be appreciated that the invention is not limited by the magnitude of the radial offset 76, and that the invention can be practiced with any desirable radial offset, depending on the cutting diameter of the reamer 10.

To provide proper clearance for the rounded lead cutting edge 50, the cutting insert 26 includes a primary relief surface 52 and a secondary relief surface 54. The primary relief surface 52 extends between the rounded lead cutting edge 50 and the secondary relief surface 54. In the illustrated embodiment, the secondary relief surface 52 extends from the bottom surface 32 to the primary relief surface 50. The primary relief surface 52 defines a primary relief angle 72 in a range between about one (1) degree and about ten (10) degrees. In one embodiment, the primary relief angle 72 is about five (5) degrees. In addition, the secondary relief surface 54 defines a secondary relief angle 74 in a range between about five (5) degrees and about twenty-five (25) degrees. In one embodiment, the secondary relief angle 74 is about sixteen (16) degrees.

Figure 9:
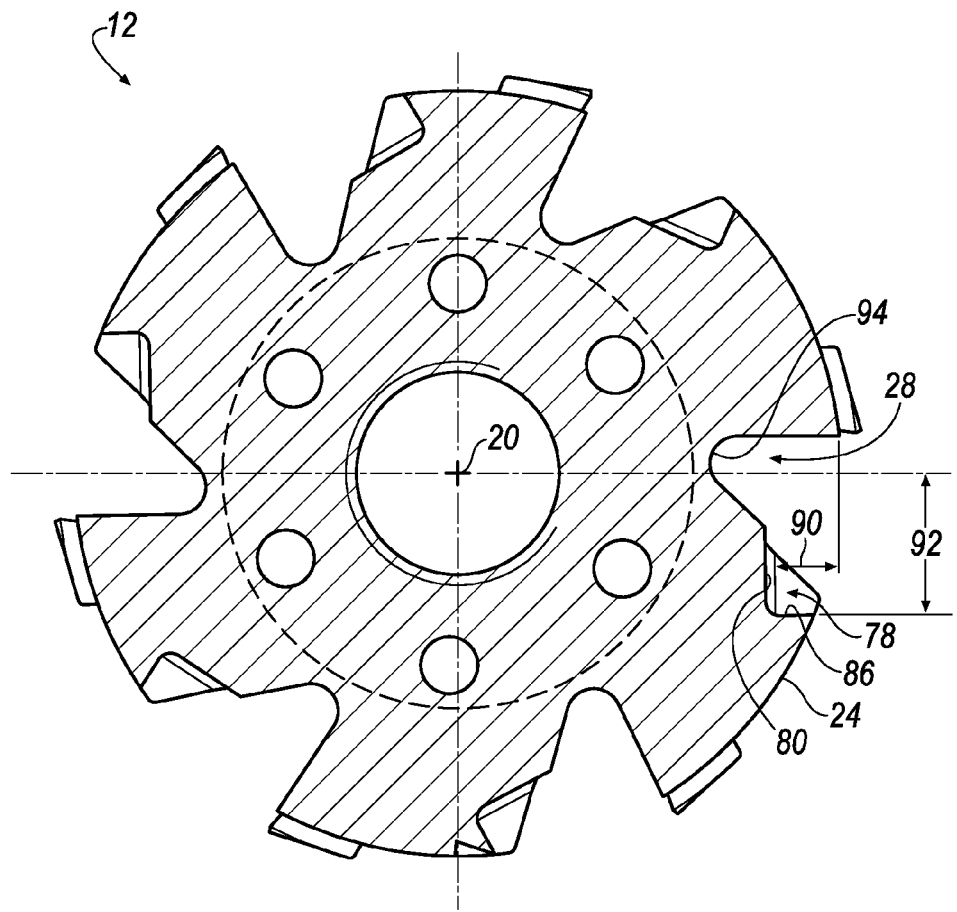
FIG. 9 is a cross-sectional view of the multi-flute reamer and chip gash opening taken along line 9-9 of FIG. 2.

Referring FIGS. 2 and 9, another aspect of the invention is that the chip flute 28 (or chip gash) of the reamer 10 includes a chip gash opening, shown generally at 78. The chip gash opening 78 facilitates in the evacuation of chips from the chip flute 28 during the cutting operation. The chip gash opening 78 extends from the rearward end 18 toward the forward end 16 of the cutting portion 12. The chip gash opening 78 is defined by a recessed bottom surface 80, a front wall 82 formed with a radius, R2, and opposing side walls 84, 86. The radiused front wall 82 is located a predetermined distance 88 from the rearward end 18 of the cutting portion 12 of the reamer 10. The chip gash opening 78 has a depth 90 with respect to the peripheral side surface 24 of the cutting portion 12. The side wall 86 is located a predetermined distance 92 from a bottom surface 94 of the chip flute 28. As seen in FIG. 2, the chip gash opening 78 widens proximate the rearward end 18 of the cutting portion 12 (i.e., narrows distal the rearward end 18).

As described above, the multi-flute reamer 10 and cutting insert of the invention offers many distinct advantages when compared to conventional rotary cutting tools. One distinct advantage is the ability to control chip formation during a cutting operation. This is accomplished by the chip breaker 44 having a radiused bottom surface 58 that extends in a direction of the central, longitudinal axis 20 of the cutting portion 12, and a rounded leading edge 74 formed at the intersection between the leading edge 42 and the front edge 56.

Another distinct advantage is the ability to properly evacuate chips during a cutting operation. This is accomplished by the chip flute 28 that includes a chip gash opening 78 that widens proximate the rearward end 18 of the cutting portion 12 of the reamer 10.

The patents and publications referred to herein are hereby incorporated by reference.

Having described presently preferred embodiments the invention may be otherwise embodied within the scope of the appended claims.

What is claimed is:

1. A multi-flute reamer, comprising:
   a cutting portion having a forward end and a rearward end and a peripheral surface therebetween, the cutting portion including a chip flute that extends rearwardly from the forward end; and
   a cutting insert mounted on the cutting portion, the cutting insert including a top surface with a chip breaker extending an entire length, L, of the cutting insert,
   wherein the chip breaker is formed with a bottom surface having a radius, R, and
   wherein the chip breaker extends in a direction of a central, longitudinal axis of the cutting portion, and
   wherein the chip flute includes a chip gash opening extending from the rearward end toward the forward end of the cutting portion, and
   wherein the chip gash opening is defined by a bottom surface recessed relative to the chip flute, a front wall formed with a radius, R2, and opposing side walls, and
   wherein the chip gash opening widens proximate the rearward end of the cutting portion.

2. The reamer according to claim 1, wherein the cutting insert further includes a front edge formed at an intersection between the top surface and the forward side surface.

3. The reamer according to claim 2, further comprising a leading edge formed at the intersection of the top surface and the radially-outward side surface.

4. The reamer according to claim 3, wherein the top surface of the cutting insert further includes a rake surface extending between the leading edge and the chip breaker.

5. The reamer according to claim 3, wherein the cutting insert further includes a rounded lead cutting edge formed with a radius, R1, at the intersection between the leading edge and the front edge.

6. The reamer according to claim 5, wherein the cutting insert further comprises a primary relief surface and a secondary relief surface, wherein the primary relief surface extends between the rounded lead cutting edge and the secondary relief surface, and wherein the secondary relief surface extends from the bottom surface to the primary relief surface.

7. The reamer according to claim 6, wherein the primary relief surface defines a primary relief angle in a range between about one degree and about ten degrees, and wherein the secondary relief surface defines a secondary relief angle in a range between about five degrees and about twenty-five degrees.

8. The reamer according to claim 1, wherein the cutting insert further comprises a bottom surface opposite the top surface, a radially-inward side surface extending from the top surface to the bottom surface, a forward side surface extending from the top surface to the bottom surface, a radially-outward side surface extending from the top surface to the bottom surface and a rearward side surface extending from the top surface to the bottom surface, a leading edge formed at an intersection between the top surface and the radially-outward side surface, the radially-outward side surface including a first facet surface extending from the leading edge to a second facet surface, the second facet surface extending from the first facet surface to the bottom surface.

9. A multi-flute reamer, comprising:
   a cutting portion having a forward end and a rearward end and a peripheral surface therebetween, the cutting section including a chip flute that extends rearwardly from the forward end, the chip flute including a chip gash opening extending from the rearward end toward the forward end of the cutting portion, wherein the chip gash opening is defined by a bottom surface recessed relative to the chip flute, a front wall formed with a radius, R2, and opposing side walls; and
   a cutting insert mounted on the cutting portion, the cutting insert including a top surface, a bottom surface opposite the top surface, a radially-inward side surface extending from the top surface to the bottom surface, a forward side surface extending from the top surface to the bottom surface, a radially-outward side surface extending from the top surface to the bottom surface and a rearward side surface extending from the top surface to the bottom surface, wherein a leading edge is formed at an intersection between the top surface and the radially-outward side surface, and wherein the radially-outward side surface includes a first facet surface extending from the leading edge to a second facet surface, the second facet surface extending from the first facet surface to the bottom surface, and wherein a front edge is formed at an intersection between the top surface and the forward side surface, and wherein the cutting insert further includes a rounded lead cutting edge formed with a radius, R1, at the intersection between the leading edge and the front edge, and wherein the cutting insert further comprises a primary relief surface and a secondary relief surface, wherein the primary relief surface extends between the rounded lead cutting edge and the secondary relief surface, and wherein the secondary relief surface extends from the bottom surface to the primary relief surface.

10. The reamer according to claim 9, wherein the primary relief surface defines a primary relief angle in a range between about one degree and about ten degrees, the secondary relief surface defines a secondary relief angle in a range between about five degrees and about twenty-five degrees.

* * * * *